United States Patent
Joshi et al.

(10) Patent No.: US 11,030,542 B2
(45) Date of Patent: Jun. 8, 2021

(54) CONTEXTUALLY-AWARE SELECTION OF EVENT FORUMS

(71) Applicant: Microsoft Technology Licensing, LLC, Redmond, WA (US)

(72) Inventors: Neel Joshi, Kirkland, WA (US); William Hart Holmes, Seattle, WA (US); Paul David Tischhauser, Redmond, WA (US); Chandresh K. Jain, Sammamish, WA (US); Lamia Benmouffok, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 793 days.

(21) Appl. No.: 15/142,947

(22) Filed: Apr. 29, 2016

(65) Prior Publication Data

US 2017/0316331 A1 Nov. 2, 2017

(51) Int. Cl.
*G06Q 10/00* (2012.01)
*G06N 7/00* (2006.01)
*G06N 3/00* (2006.01)

(52) U.S. Cl.
CPC ............ *G06N 7/005* (2013.01); *G06N 3/006* (2013.01); *G06Q 10/00* (2013.01)

(58) Field of Classification Search
CPC ............ G06N 7/00; G06N 7/005; G06N 3/00; G06N 3/006; G06N 3/02; G06B 5/02;

(Continued)

(56) References Cited

U.S. PATENT DOCUMENTS 5,845,300 A 12/1998 Comer et al.
6,615,184 B1 9/2003 Hicks (Continued)

FOREIGN PATENT DOCUMENTS

CN 102165470 A 8/2011
WO WO2001/24084 A2 4/2001

(Continued)

OTHER PUBLICATIONS

Apptoto, "Appointment Reminders," retrieved on: Nov. 7, 2015, Available at: https://www.apptoto.com/, 11 pages.

(Continued)

*Primary Examiner* — Li Wu Chang
(74) *Attorney, Agent, or Firm* — Newport IP, LLC; Scott Y. Shigeta

(57) ABSTRACT

Techniques enable contextually-aware selections of event forums. Scheduling data can be analyzed to identify a context associated with an appointment. A forum that is appropriate for the identified context can be selected and utilized. The analysis can also utilize traffic data, map data, weather data, user preferences, and other contextual data to select one or more forums. A forum can be a place or communication medium. A service provider can associate one or more forums with a particular skill set. For example, a legal office can associate an online forum, such a video-conference, with a first category of services, and an on-site location for a second category of services. Depending on a category of services identified in one or more user preferences and/or meeting requests, a forum can be selected. Other factors, which may include weather conditions, traffic conditions, and commute times can also influence the selection of a forum.

14 Claims, 11 Drawing Sheets

(58) Field of Classification Search
CPC ........ G01C 21/00; G01C 21/30; G01C 21/36; G06Q 10/00; G08B 19/00; G06F 15/16
See application file for complete search history.

(56) References Cited

U.S. PATENT DOCUMENTS

| | | | |
|---|---|---|---|
| 7,096,193 B1 | 8/2006 | Beaudoin et al. | |
| 7,185,271 B2 | 2/2007 | Lee et al. | |
| 7,236,976 B2 | 6/2007 | Breitenbach et al. | |
| 7,487,145 B1 | 2/2009 | Gibbs et al. | |
| 7,499,715 B2 | 3/2009 | Carro et al. | |
| 7,584,114 B2 | 9/2009 | Estrada et al. | |
| 7,634,463 B1 | 12/2009 | Katragadda et al. | |
| 7,693,735 B2 | 4/2010 | Carmi et al. | |
| 7,693,736 B1 | 4/2010 | Chu et al. | |
| 8,060,395 B1 | 11/2011 | Frasher et al. | |
| 8,095,476 B2 | 1/2012 | Bierner et al. | |
| 8,234,293 B2 | 7/2012 | Martynov et al. | |
| 8,375,320 B2 | 2/2013 | Kotler et al. | |
| 8,438,070 B2 | 5/2013 | Butler | |
| 8,489,615 B2 | 7/2013 | Dhara et al. | |
| 8,601,019 B1 | 12/2013 | Weininger et al. | |
| 8,625,769 B1 | 1/2014 | Allen et al. | |
| 8,645,825 B1 | 2/2014 | Cornea et al. | |
| 8,719,198 B2 | 5/2014 | Zheng et al. | |
| 8,738,414 B1 | 5/2014 | Nagar et al. | |
| 8,930,181 B2 | 1/2015 | Parikh | |
| 8,983,500 B2 | 3/2015 | Yach | |
| 9,053,467 B2 | 6/2015 | Maresh et al. | |
| 9,058,597 B2 | 6/2015 | DeLuca et al. | |
| 9,135,250 B1 | 9/2015 | Duddu et al. | |
| 9,282,430 B1 | 3/2016 | Brandmaier et al. | |
| 9,342,559 B1 | 5/2016 | Jedrzejowicz | |
| 9,482,542 B2 * | 11/2016 | Berczi | G01C 21/343 |
| 9,630,611 B1 * | 4/2017 | Dufford | B60W 10/06 |
| 2002/0016729 A1 | 2/2002 | Breitenbach et al. | |
| 2003/0103415 A1 | 6/2003 | Bates et al. | |
| 2005/0038688 A1 | 2/2005 | Collins et al. | |
| 2005/0114191 A1 | 5/2005 | Atkin et al. | |
| 2005/0288987 A1 | 12/2005 | Sattler et al. | |
| 2006/0069086 A1 | 3/2006 | Beyda et al. | |
| 2006/0218088 A1 | 9/2006 | Flora et al. | |
| 2006/0287905 A1 | 12/2006 | Stoner | |
| 2006/0293943 A1 | 12/2006 | Tischhauser et al. | |
| 2007/0168208 A1 | 7/2007 | Aikas et al. | |
| 2007/0203769 A1 | 8/2007 | Thomas | |
| 2007/0226374 A1 | 9/2007 | Quarterman et al. | |
| 2007/0239506 A1 | 10/2007 | Jania et al. | |
| 2007/0288283 A1 | 12/2007 | Fitzpatrick | |
| 2008/0033778 A1 | 2/2008 | Boss et al. | |
| 2008/0114716 A1 | 5/2008 | Mock | |
| 2008/0167911 A1 | 7/2008 | Hatakeda | |
| 2008/0189360 A1 | 8/2008 | Kiley et al. | |
| 2008/0263016 A1 | 10/2008 | Lokitz | |
| 2008/0300955 A1 | 12/2008 | Hamilton et al. | |
| 2009/0158200 A1 | 6/2009 | Palahnuk et al. | |
| 2009/0228305 A1 | 9/2009 | Gustafsson et al. | |
| 2009/0313077 A1 | 12/2009 | Wheeler, IV | |
| 2009/0327019 A1 | 12/2009 | Addae et al. | |
| 2010/0070323 A1 | 3/2010 | Polcari et al. | |
| 2010/0082376 A1 | 4/2010 | Levitt | |
| 2010/0121665 A1 | 5/2010 | Boyer | |
| 2010/0153160 A1 | 6/2010 | Bezemer et al. | |
| 2010/0161367 A1 | 6/2010 | Keohane et al. | |
| 2010/0274647 A1 | 10/2010 | Earle | |
| 2010/0287024 A1 * | 11/2010 | Ward | G01C 21/26 705/7.15 |
| 2010/0293029 A1 | 11/2010 | Olliphant | |
| 2011/0004590 A1 | 1/2011 | Lilley et al. | |
| 2011/0087426 A1 * | 4/2011 | Feng | G01C 21/343 701/532 |
| 2011/0090078 A1 | 4/2011 | Kim | |
| 2011/0093538 A1 | 4/2011 | Weir et al. | |
| 2011/0184768 A1 | 7/2011 | Norton et al. | |
| 2012/0004942 A1 | 1/2012 | Callanan | |
| 2012/0022893 A1 | 1/2012 | Findlay et al. | |
| 2012/0102498 A1 | 4/2012 | Subramanya et al. | |
| 2012/0136743 A1 | 5/2012 | Mcquade et al. | |
| 2012/0203589 A1 | 8/2012 | Eggena et al. | |
| 2012/0215578 A1 | 8/2012 | Swierz et al. | |
| 2012/0275598 A1 | 11/2012 | Vimpari et al. | |
| 2012/0278388 A1 | 11/2012 | Kleinbart et al. | |
| 2012/0284637 A1 | 11/2012 | Boyer | |
| 2013/0110545 A1 | 5/2013 | Smallwood | |
| 2013/0218622 A1 | 8/2013 | MacKenzie et al. | |
| 2014/0025670 A1 | 1/2014 | Daran et al. | |
| 2014/0067455 A1 | 3/2014 | Zhang et al. | |
| 2014/0129279 A1 | 5/2014 | Mukherjee et al. | |
| 2014/0180811 A1 | 6/2014 | Boal | |
| 2014/0188541 A1 | 7/2014 | Goldsmith et al. | |
| 2014/0200943 A1 | 7/2014 | Febonio et al. | |
| 2014/0229258 A1 | 8/2014 | Seriani | |
| 2014/0278677 A1 | 9/2014 | Tischhauser et al. | |
| 2014/0279208 A1 | 9/2014 | Nickitas et al. | |
| 2014/0330738 A1 | 11/2014 | Falcone et al. | |
| 2014/0365125 A1 * | 12/2014 | Vulcano | G01C 21/265 701/533 |
| 2014/0365513 A1 | 12/2014 | Aftab et al. | |
| 2014/0379822 A1 | 12/2014 | Ambrosino | |
| 2015/0046292 A1 | 2/2015 | Zamer et al. | |
| 2015/0046440 A1 | 2/2015 | Shoham et al. | |
| 2015/0100326 A1 | 4/2015 | Kowalkiewicz et al. | |
| 2015/0149203 A1 | 5/2015 | Csurka et al. | |
| 2015/0186850 A1 | 7/2015 | Ramji | |
| 2015/0358790 A1 | 12/2015 | Nasserbakht | |
| 2016/0004565 A1 | 1/2016 | Harper et al. | |
| 2016/0171540 A1 | 6/2016 | Mangipudi et al. | |
| 2016/0249319 A1 | 8/2016 | Dotan-cohen et al. | |
| 2017/0236097 A1 | 8/2017 | Smith | |
| 2017/0316022 A1 | 11/2017 | Joshi et al. | |
| 2017/0316385 A1 | 11/2017 | Joshi et al. | |
| 2017/0316386 A1 | 11/2017 | Joshi et al. | |
| 2017/0316387 A1 | 11/2017 | Joshi et al. | |
| 2017/0316484 A1 | 11/2017 | Holmes et al. | |

FOREIGN PATENT DOCUMENTS

| | | |
|---|---|---|
| WO | WO2012/048163 A2 | 4/2012 |
| WO | WO2014/031722 A1 | 2/2014 |
| WO | WO2014/039898 A2 | 3/2014 |
| WO | WO2015/077398 A1 | 5/2015 |
| WO | WO2015/102843 A1 | 7/2015 |
| WO | WO2015/136404 A1 | 9/2015 |
| WO | 2015183764 A1 | 12/2015 |

OTHER PUBLICATIONS

Bast, et al., "Output-Sensitive Autocompletion Search", in Journal of Information Retrieval, vol. 11, Issue 4, Aug. 2008, 12 pages.

Bast, et al., "Type Less, Find More: Fast Autocompletion Search with a Succinct Index", in Proceedings of the 29th annual international ACM SIGIR conference on Research and development in information retrieval, Aug. 6, 2006, 8 pages.

Calendy.com, "Specify a Meeting Location", Retrieved on: Nov. 6, 2015 Available at: http://support.calendly.com/knowledgebase/articles/373436-specify-a-meeting-location, 4 pages.

Cisco, "IoE—Location Aware Solutions for Healthcare Overview", Published on: Sep. 30, 2015, available at: http://www.cisco.com/c/en/us/solutions/collateral/enterprise-networks/connected-mobile-experiences/solution_overview_c22-723174.pdf, 6 pages.

ClientTell.net. "Appointment Reminders," Published on: May 17, 2014, available at: http://www.clienttell.net/, 2 pages.

CUMC, "Scheduling a Meeting in the Outlook 2010 Calendar", Published on: May 10, 2014 Available at: http://www.cumc.columbia.edu/it/howto/email/schedule.html, 3 pages.

Dupont, Dupont, Paula, "The 16 Best Meeting Scheduler Apps and Tools", Published on: Dec. 2, 2014, Available at: https://zapiercom/blog/best-meeting-scheduler-apps/, 39 pages.

IBM, "Creating a Calendar Event", Retrieved on: Nov. 6, 2015, Available at: https://apps.na.collabserv.com/help/index.jsp?topic=%2Fcom.ibm.cloud.inotes.doc%2Ft_creating_a_calendar_event.html, p. 2.

(56) References Cited

OTHER PUBLICATIONS

"JustDial", Retrieved on: Nov. 6, 2015, Available at: http://www.justdial.com/, 16 pages.
Kessler, Derek, "Google Calendar update adds location autocomplete from Google Maps", Published on: Apr. 17, 2014, Available at: http://www.androidcentral.com/google-calendar-update-adds-location-autocomplete-google-maps, 5 pages.
Khoussainova, et al., "SnipSuggest: Context-Aware Autocompletion for SQL", in Proceedings of the VLDB Endowment, vol. 4, No. 1, Aug. 29, 2011, pp. 22-33.
Lussier, Michael, "Multi-field Partial Word Autocomplete in Elasticsearch Using nGrams", Published on: Jan. 28, 2014, Available at: https://qbox.io/blog/multi-field-partial-word-autocomplete-in-elasticsearch-using-ngrams, 12 pages.
Microsoft, "Create a service activity without checking for conflicts", Published on: Nov. 27, 2013, Available at: https://www.microsoft.com/en-us/dynamics/crm-customer-center/create-a-service-activity-without-checking-for-conflicts.aspx, 1 page.
Microsoft, "Create an Add to calendar link in an email message", Published on: May 6, 2015 Available at: https://support.office.com/en-in/article/Create-an-Add-to-calendar-link-in-an-email-message-34f8ea28-322a-4867-b423-2998f9634e59, 3 pages.
Microsoft, "Create or edit an appointment", Published on: Jul. 18, 2014, Available at: https://www.microsoft.com/en-us/dynamics/crm-customer-center/create-or-edit-an-appointment.aspx, 2 pages.
Microsoft, "Schedule and Appointment Entities", Published on: May 27, 2011 Available at: https://msdn.microsoft.com/en-us/library/gg334403.aspx, 1 page.
Oracle, "Oracle Common Application Calendar Implementation Guide", Published on: Sep. 10, 2015, Available at: ttps://docs.oracle.com/cd/E18727_01/doc.121/e13405/T88223T88232.htm, 6 pages.
Osterhoff, et al., "Widen the Peepholes! Entity-based Auto-Suggestion as a rich and yet immediate Starting Point for Exploratory Search", in Proceedings of 2nd Workshop on Interaction and Visualization in Data Web, Sep. 20, 2012, 8 pages.
"International Search Report and Written Opinion Issued in PCT Application No. PCT/US2017/029034", dated Jul. 27, 2017, 14 Pages.
"International Search Report and Written Opinion Issued in PCT Application No. PCT/US17/028705", dated Jul. 26, 2017, 10 Pages.
"Final Office Action Issued in U.S. Appl. No. 15/142,108", dated Oct. 4, 2018, 28 Pages.
"Non Final Office Action Issued in U.S. Appl. No. 15/142,108", dated Apr. 11, 2018, 28 Pages.
"Final office action Issued in U.S. Appl. No. 15/142,513", dated Oct. 18, 2018, 30 Pages.
"Non Final Office Action Issued in U.S. Appl. No. 15/142,513", dated May 3, 2018, 30 Pages.
"Non Final Office Action Issued in U.S. Appl. No. 15/142,574", dated Aug. 28, 2018, 37 Pages.
"Final Office Action Issued in U.S. Appl. No. 15/142,818", dated Nov. 29, 2018, 47 Pages.
"Non Final Office Action Issued in U.S. Appl. No. 15/142,818", dated Jun. 1, 2018, 35 Pages.
"Non Final Office Action Issued in U.S. Appl. No. 15/143,225", dated Jul. 26, 2018, 14 Pages.
Huyng, et al., "Korean Patent Office", Retrieved From: ip.com, 2006, 16 Pages.
PCT/US2017/028704—International Search Report and Written Opinion, dated Jun. 2, 2017, 13 pages.
PCT/US2017/029031—International Search Report and Written Opinion, dated Jun. 1, 2017, 14 pages.
PCT/US2017/029032—International Search Report and Written Opinion, dated May 30, 2017, 13 pages.
PCT/US2017/029033—International Search Report and Written Opinion, dated Jul. 26, 2017, 14 pages.
"Office Action Issued in European Patent Application No. 17721004.4", dated Jul. 9, 2020, 6 Pages.

* cited by examiner

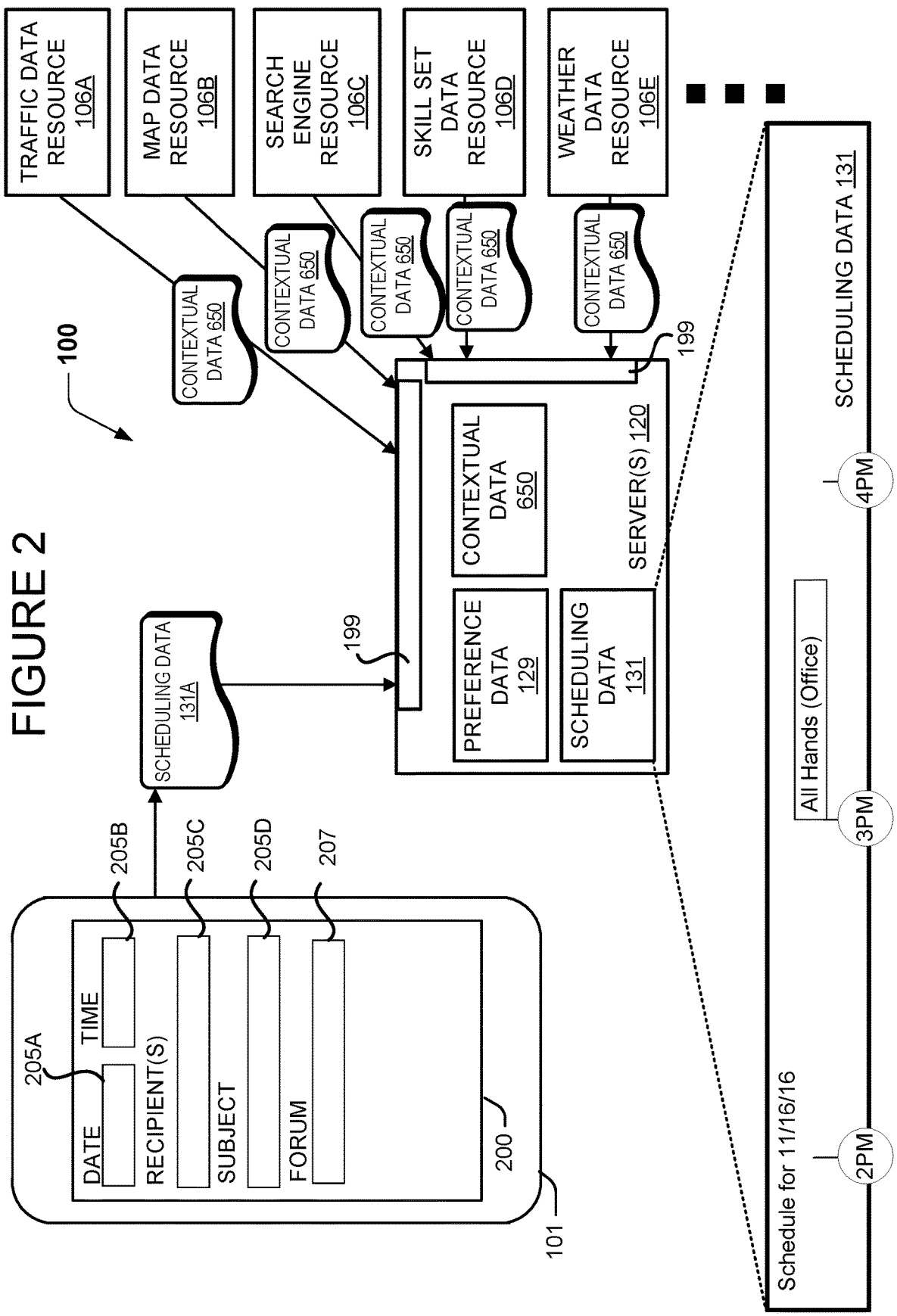

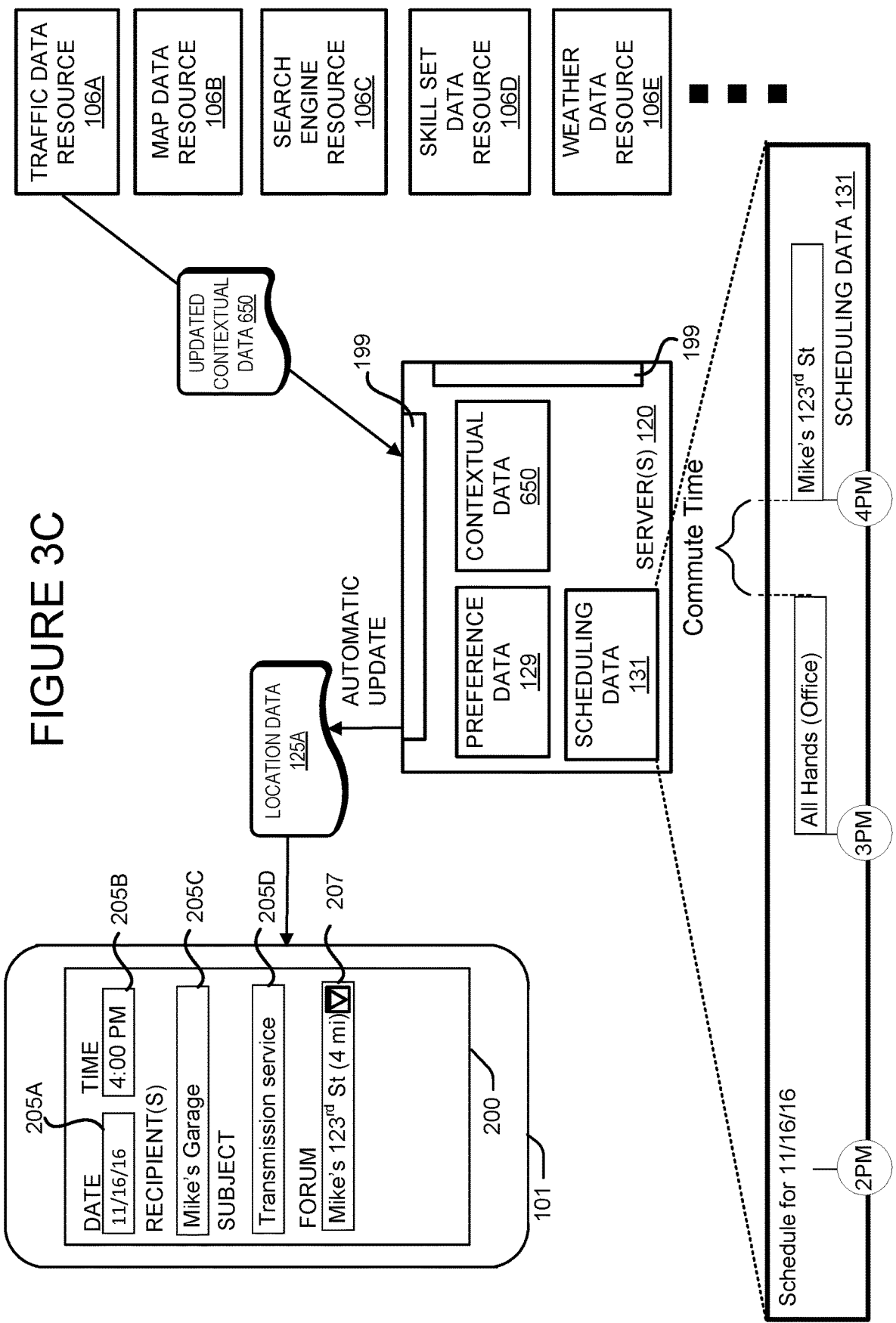

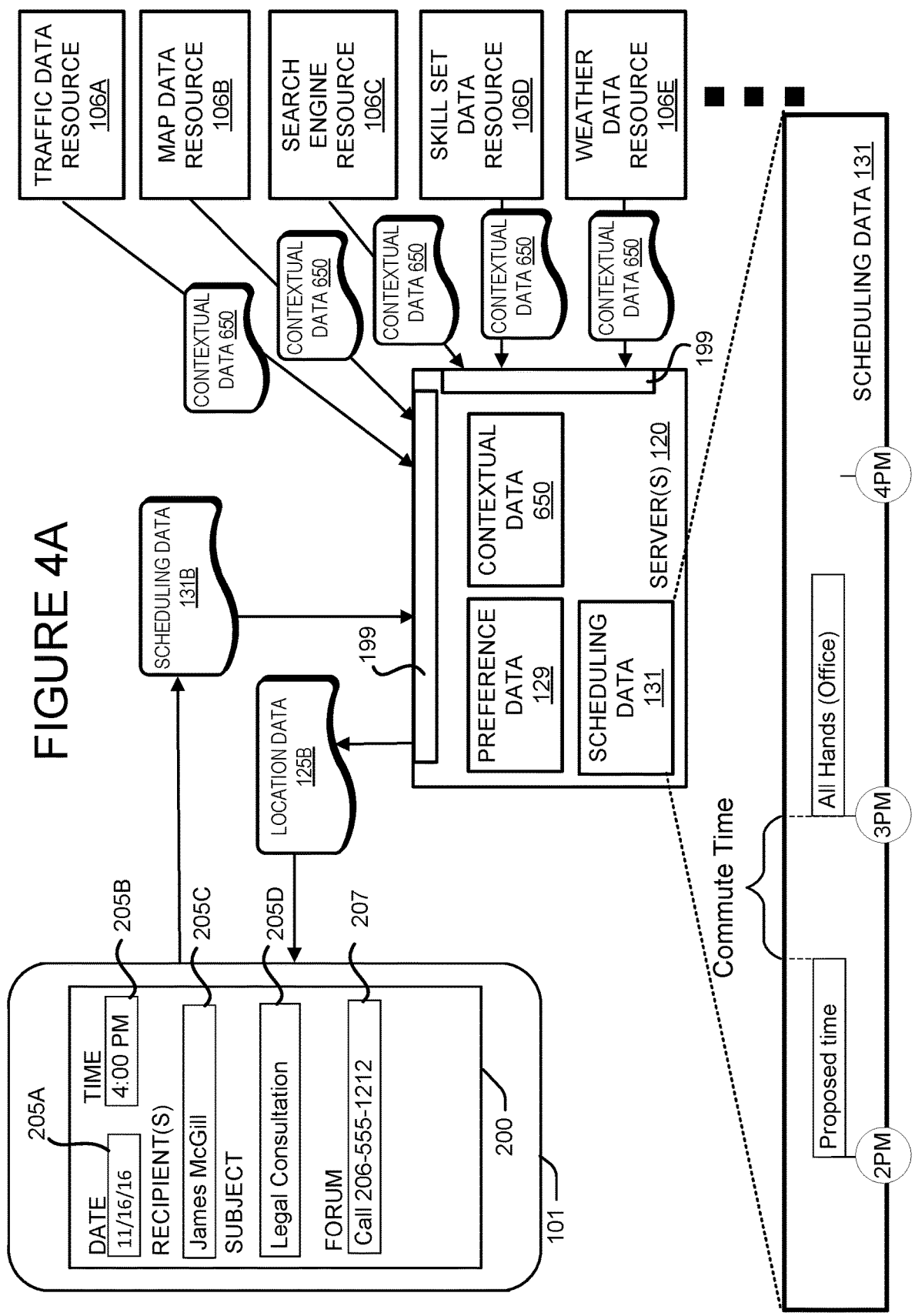

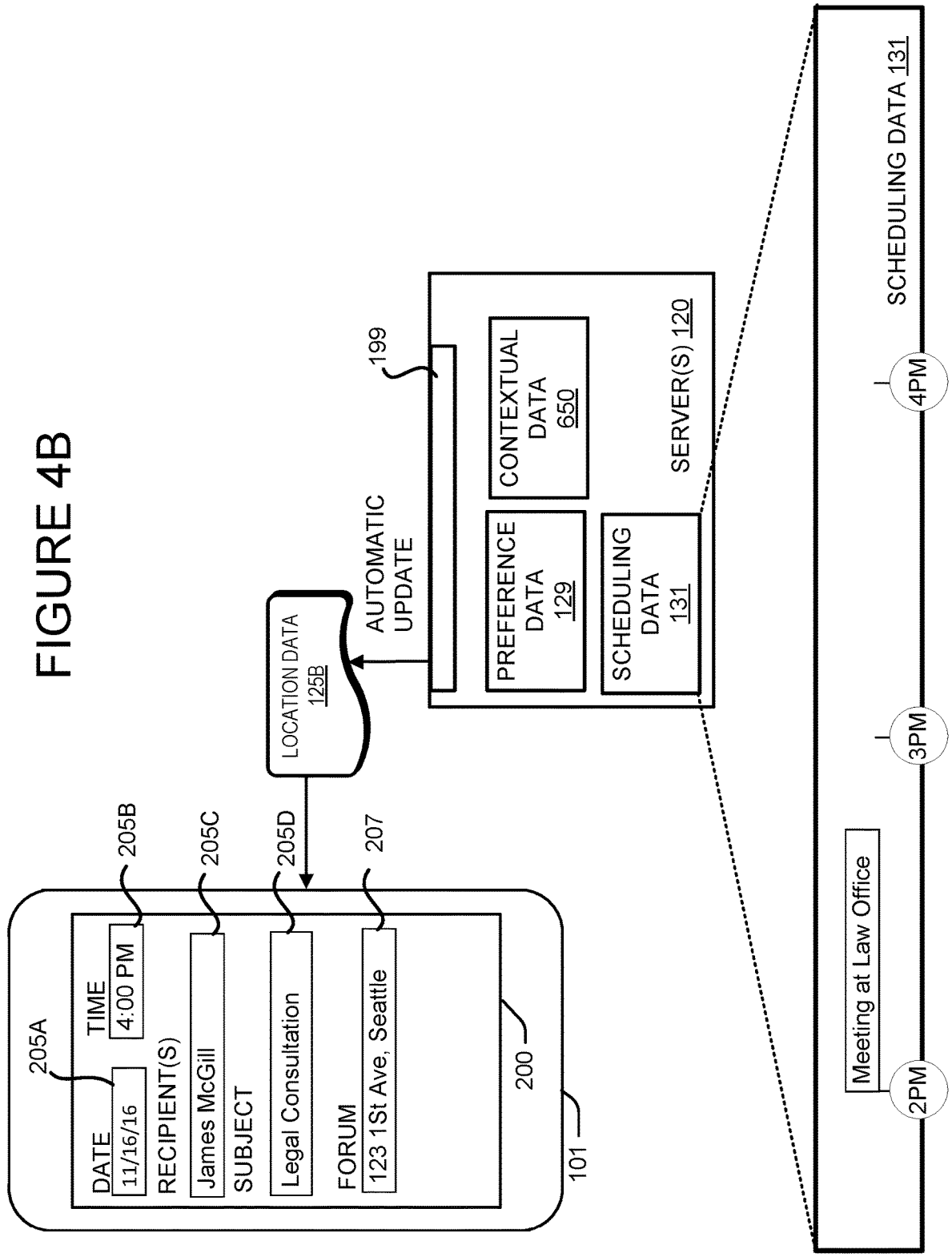

CONTEXTUALLY-AWARE SELECTION OF EVENT FORUMS

BACKGROUND

When scheduling appointments, computer users can be presented with a number of challenging tasks. In addition to identifying a time, date, and participants, users are sometimes tasked with identifying a location for a meeting. Once a location is identified, some existing systems provide a location text field that enables users to manually type a description of a location. To assist users, some existing systems populate location text fields with room numbers or addresses from a directory.

Although some existing software applications provide some assistance in populating location text fields, users are still required to identify a location. Given the information that is provided by some calendaring systems, identifying the most optimal location for all involved parties can be difficult. For example, in some situations, even though a calendaring system can identify a timeslot that is available for meeting participants, some existing systems do not readily display information describing the location of each participant. Thus, a meeting coordinator may not be able to identify a location that is optimal for each attendee. Some participants may be required to travel a long distance from their office, other meetings, etc. Such inefficiencies have become the norm in some work environments and meetings can be often delayed or some attendees may even miss an appointment completely when such scheduling practices are utilized.

The challenges of finding the right location for an appointment can become more difficult when a specialized skill set or expert contributions are required. Existing systems do not usually provide features to assist users with such needs. Such limitations can impact a number of customers that can align with available timeslots. Such limitations can also impact a business as well as other efficiencies when it comes to time, energy, and resources.

It is with respect to these and other considerations that the disclosure made herein is presented.

SUMMARY

The techniques disclosed herein utilize contextual data from a number of resources to select event forums. In some configurations, data defining a meeting request or a calendar event can be analyzed to identify a context associated with an appointment. One or more forums that are most appropriate for the identified context can be selected and utilized. A forum can be a place or medium where information can be exchanged in real time. The analysis can also utilize location data, traffic data, map data, weather data, user preferences, skill set data, and other contextual data to select one or more forums that meet one or more criteria. In some configurations, a service provider can associate one or more locations with a particular skill set, service category, or any suitable subject. For example, an automotive repair shop can associate an off-site location for a first category of repair services, and an on-site location for a second category repair services. In another example, a legal office can associate an online forum, such a videoconference or teleconference, with a first category of legal services, an off-site location for a second category of legal services, and an on-site location for a third category of legal services. Depending on the needs, e.g., a category of services, identified in one or more user preferences, calendar events, and/or meeting requests, one or more forums can be selected. Other factors, which may include weather conditions, traffic conditions, and commute times can also influence the selection of one or more forums. In some configurations, the techniques disclosed herein generate a ranked list of forums for a particular meeting request.

The techniques disclosed herein can also continuously analyze scheduling data to dynamically modify forums for various calendar events based on changed circumstances. For example, a system can analyze scheduling data for a number of appointments to identify one or more conflicts. Based on the identification of one or more predetermined actions, such as a conflict, a forum for a calendar event can be automatically modified. Notifications of such modifications can be distributed to one or more participants. In one illustrative example, if a user is required to commute between two different appointments, a system can continuously monitor traffic data, weather data, and/or map data to determine a probability of a commute between the appointments in one or more forecasted scenarios. If a probability of the commute drops below a particular threshold, a forum for at least one appointment can be modified. A forum modification, for instance, can include a change from an on-site location to a teleconference. A forum modification can also include a change from one geographical location to another geographical location.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items.

FIG. 2 is a block diagram showing an illustrative example of a server processing scheduling data defining a meeting request, scheduling data defining a number of calendar events, and contextual data;

FIGS. 3A-3C include block diagrams showing illustrative examples where location data defining one or more forums is generated and modified in response to an analysis of contextual data;

FIGS. 4A-4B include block diagrams showing illustrative another example where location data defining one or more forums is generated and modified in response to an analysis of contextual data;

DETAILED DESCRIPTION

Figure 1:
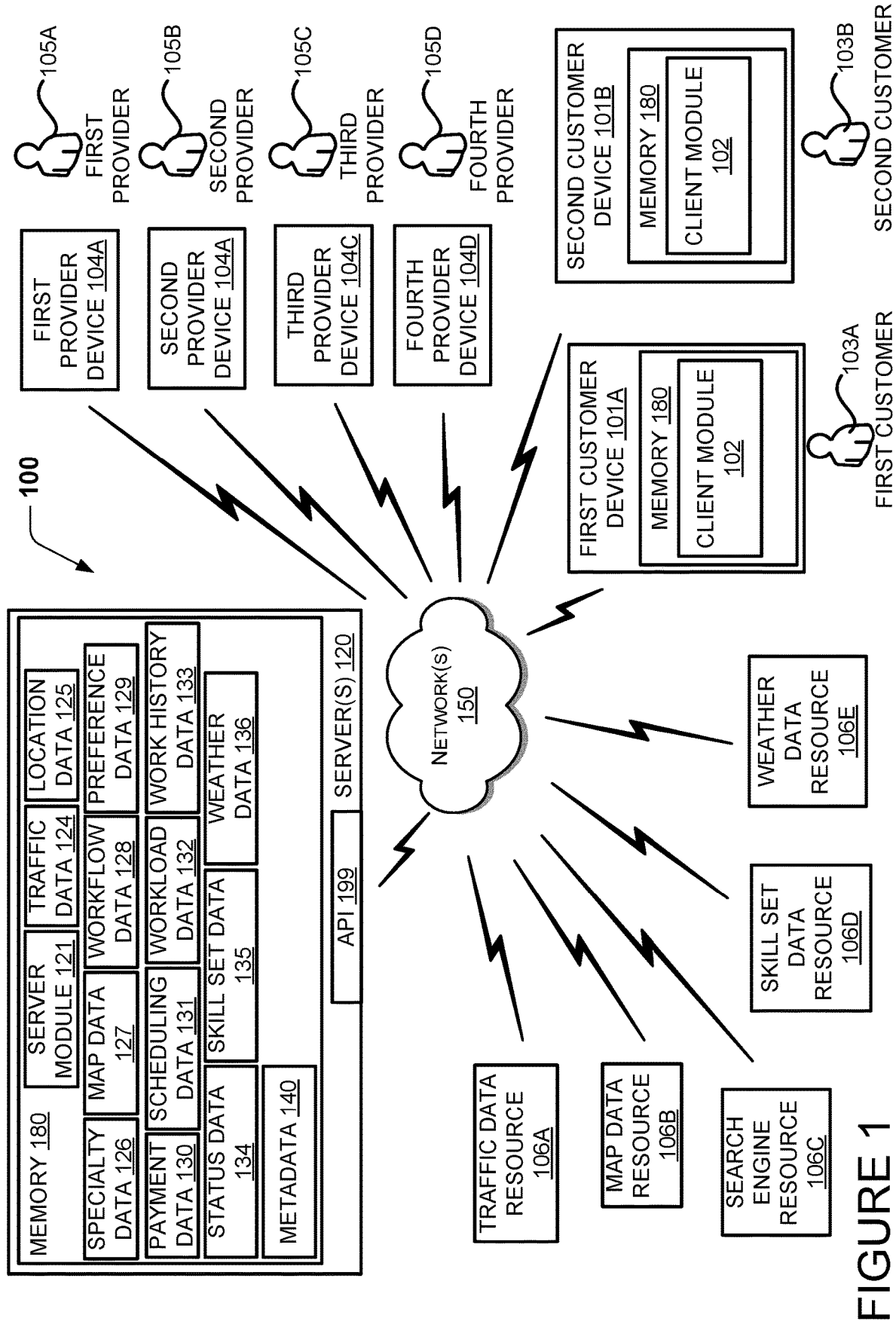
FIG. 1 is a block diagram showing an illustrative system for enabling contextually-aware selections of event forums.

The following Detailed Description describes technologies enabling contextually-aware selections of event forums. In some configurations, data defining a meeting request or a calendar event can be analyzed to identify a context associated with an appointment. One or more forums that are most appropriate for the identified context can be selected and utilized. A forum can be a place or medium where information can be exchanged in real time. The analysis can also utilize location data, traffic data, map data, weather data, user preferences, skill set data, and other contextual data to select one or more forums that meet one or more criteria. In some configurations, a service provider can associate one or more locations with a particular skill set, service category, or any suitable subject. For example, an automotive repair shop can associate an off-site location for a first category of repair services, and an on-site location for a second category repair services. In another example, a legal office can associate an online forum, such a videoconference or teleconference, with a first category of legal services, an off-site location for a second category of legal services, and an on-site location for a third category of legal services. Depending on the needs, e.g., a category of services, identified in one or more user preferences and/or meeting requests, one or more forums can be selected. Other factors, which may include weather conditions, traffic conditions, and commute times can also influence the selection of one or more forums. In some configurations, the techniques disclosed herein generate a ranked list of forums for a particular meeting request.

The techniques disclosed herein can also continuously analyze scheduling data to dynamically modify forums for various calendar events based on changed circumstances. For example, a system can analyze scheduling data for a number of appointments to identify one or more conflicts. Based on the identification of one or more predetermined actions, a forum for a meeting event can be automatically modified. Notifications of such modifications can be distributed to one or more participants. In one illustrative example, if a user is required to commute between two different appointments, the analysis of traffic data, weather data, and map data can continuously monitor a probability of a commute between the appointments. If the probability of the commute drops below a particular threshold, a forum for at least one appointment can be modified. A forum modification, for instance, can include a change from an on-site location to a teleconference.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

By the use of the technologies described herein, contextual data from a number of resources can be utilized for enabling contextually-aware selections of event forums. Such technologies can improve user interaction with a computing device by automatically identifying, selecting and taking action on data indicating one or more forums that are contextually relevant to a at least one calendar event. Configurations can be beneficial in assisting users coordinating aspects of a project, such as calendar events, particularly when a user has a large number of events to schedule. Among many benefits provided by the technologies described herein, a user's interaction with a device may be improved, which may reduce the number of inadvertent inputs, reduce the consumption of processing resources, and mitigate the use of network resources. Other technical effects other than those mentioned herein can also be realized from implementations of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling contextually-aware selections of event forums. As will be described in more detail below with respect to FIGS. 6-8, there are a number of applications and services that can embody the functionality and techniques described herein.

FIG. 1 is a block diagram showing aspects of one example environment 100, also referred to herein as a "system 100," disclosed herein for enabling contextually-aware selections of event forums. In one illustrative example, the example environment 100 can include one or more servers 120, one or more networks 150, one or more customer devices 101A-101B (collectively "customer devices 101"), one or more provider devices 104A-104D (collectively "provider devices 104"), and one or more resources 106A-106E (collectively "resources 106"). The customer devices 101 can be utilized for interaction with one or more customers 103A-103B (collectively "customers 103"), and the provider devices 104 can be utilized for interaction with one or more service providers 105A-105D (collectively "service providers 105"). This example is provided for illustrative purposes and is not to be construed as limiting. It can be appreciated that the example environment 100 can include any number of devices, customers, providers, and/or any number of servers 120.

For illustrative purposes, the service providers 105 can be a company, person, or any type of entity capable of providing services or products for the customers 103, which can also be a company, person or other entity. For illustrative purposes, the service providers 105 and the customers 103 can be generically and individually referred to herein as "users." In general, the techniques disclosed herein enable users to utilize contextual data from a number of resources 106 to generate workflow data 128 and other data objects related to the workflow data 128. In some configurations, a data object may include one or more calendar events related to stages of the workflow. Contextual data can be analyzed to determine one or more candidate timeslots for individual stages. The candidate timeslots can be ranked based on contextual data and a ranked list of candidate timeslots can be presented to the user for selection.

The customer devices 101, provider devices 104, servers 120 and/or any other computer configured with the features disclosed herein can be interconnected through one or more local and/or wide area networks, such as the network 150. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

A customer device 101 or a provider device 104 (collectively "computing devices") can operate as a stand-alone device, or such devices can operate in conjunction with other computers, such as the one or more servers 120. Individual computing devices can be in the form of a personal computer, mobile phone, tablet, wearable computer, including a head-mounted display (HMD) or watch, or any other computing device having components for interacting with one or more users and/or remote computers. In one illustrative example, the customer device 101 and the provider device 104 can include a local memory 180, also referred to herein as a "computer-readable storage medium," configured to store data, such as a client module 102 and other contextual data described herein.

The servers 120 may be in the form of a personal computer, server farm, large-scale system or any other computing system having components for processing, coordinating, collecting, storing, and/or communicating data between one or more computing device. In one illustrative example, the servers 120 can include a local memory 180, also referred to herein as a "computer-readable storage medium," configured to store data, such as a server module 121 and other data described herein. The servers 120 can also include components and services, such as the application services and shown in FIG. 6, for providing, receiving, and processing contextual data and executing one or more aspects of the techniques described herein. As will be described in more detail herein, any suitable module may operate in conjunction with other modules or devices to implement aspects of the techniques disclosed herein.

In some configurations, an application programming interface 199 ("API") exposes an interface through which an operating system and application programs executing on the computing device can enable contextually-aware selections of event forums. Through the use of this data interface and other interfaces, the operating system and application programs can process contextual data and modify scheduling data as described herein.

The system 100 may include a number of resources, such as a traffic data resource 106A, map data resource 106B, search engine resource 106C, skill set data resource 106D, and a weather data resource 106E (collectively referred to herein as "resources 106"). The resources 106 can be a part of the servers 120 or separate from the servers 120, and the resources 106 can provide contextual data, including traffic data 124, location data 125, specialty data 126, map data 127, workflow data 128, preference data 129, payment data 130, scheduling data 131, workload data 132, work history data 133, status data 134, skill set data 135, weather data 136, and other data described herein. The metadata 140 can include, but is not limited to, a person's name, a company name, contact information, location data, and any other data related to a provider 105 or a customer 103. In some configurations, the metadata 140 can include any format suitable for populating one or more data entry fields of a user interface.

These example resources 106 and contextual data are provided for illustrative purposes and are not to be construed as limiting. It can be appreciated that the techniques disclosed herein may utilize more or fewer resources 106 shown in FIG. 1. It can also be appreciated that some of the resources shown in FIG. 1 can obtain any type of contextual information from other resources such as social networks, e-commerce systems, government systems, and other like sources. For instance, sales data from e-commerce systems can be used to determine a performance indicator of a customer or a provider.

The scheduling data 131 can define one or more attributes of one or more calendar events (also referred to as "appointments") for the customers 103 and the providers 105. The scheduling data 131 can define a start time and an end time. The scheduling data 131 can also include location data 125 if an appointment is associated with a location. A location, also referred to as a geographic location, can be described with global coordinates, an address, a room number and other information identifying a location. The scheduling data 131 can define a single appointment or a series of appointments. In addition, the scheduling data 131 can include communication information such as a phone number, IM address, URL, or other information for facilitating a voice or video conference. The scheduling data 131 can also include a text description of an appointment and other data indicating a subject, e.g., a service category, a customer 103 and/or a provider 105. The scheduling data 131 can also include communication related to a calendar event, such as a request for a calendar event or an acceptance of a request for a calendar event. The scheduling data 131 can be stored on the server 120, customer device 101, provider device 104, or any suitable computing device, which may include a Web-based service.

For illustrative purposes, the location data 125 can be used to describe a forum or a calendar event. A forum can include any type of medium where ideas, data and/or information can be exchanged between two or more parties. Examples of various forums can include telephone calls, videoconferencing calls, instant message chats, etc. A forum may also include a location which may be identified associated with a geographic location, global coordinates, an address, a room number and other information identifying a location.

The map data 127 can define roads and other types of travel paths within a geographic area. The map data 127 can also include topography data and other data that may influence a commute of a user from one location to another. The map data 127 can also include data defining buildings, homes, and other landmarks. The map data 127 can also include image data which may include a satellite image of the roads and paths within a geographic area as well as images of buildings, homes and other landmarks. The map data 127 may be from a number of resources, including a web-based service, government services, or other resources.

The traffic data 124 can include real-time updates on vehicle traffic within a geographic area. The traffic data 124 can also include historical travel data that can be used to predict travel times between two or more locations. The traffic data 124 can be in any suitable format for defining projected travel times between two or more locations that considers a time of travel, weather at a time of travel, traffic at a time of travel, and other factors that may influence a projected travel time. For example, the traffic data 124 can include updates with respect to road closures, delays, construction, new roads, or other scenarios that can impact activity with respect to a calendar event. The traffic data 124 may be from a number of resources, including a web-based service, government services, or other resources.

The weather data 136 can include current, historical, and forecast data indicating weather conditions. The weather data 136 can include data with respect to wind, precipitation, temperature and other conditions that may influence a commute from one location to another. The weather data 136 can be in any suitable format for enabling the projection of travel times between two or more locations. The weather data 136 may be from a number of resources, including a web-based service, government services, or other resources.

The specialty data 126 can include information pertaining to a specialization, subject, topic, one or more industries, or an area of interest. For example, specialty data 126 may include details relating to a medical topic, such as pediatrics, dentistry, etc. In other examples, the specialty data 126 may relate to diseases, cures, conditions, and other like topics. The specialty data 126 can be obtained from a number of different resources including web-based resources such as sites provided by WebMD, American Medical Association, and the Center of Disease Control. These examples are provided for illustrative purposes and are not to be construed as limiting, as the specialty data 126 can be related to any topic or areas of interest. Specialty data 126 can also associate at least one subject, e.g., a service category, with one or more forums.

The workflow data 128 can define a multi-step process and attribute definitions within each step of the process. The workflow data 128 can be obtained from a number of different resources including web-based resources. In addition, the workflow data 128 can be derived from other data such as the specialty data 126. For example, specialty data 126 that pertains to pediatrics can be analyzed to determine a process that involves a number of steps which may include immunization shots, follow-up exams, and other milestones and tasks that are recommended at certain times.

The workload data 132 may include a listing of a number of services, projects, or appointments that are scheduled for a provider. For example, the workload data 132 may list a number of projects that are currently scheduled for a company. The workload data 132 can also be based on scheduling data 131, such as a number of appointments that are scheduled for a doctor. The workload data 131 can also define one or more thresholds. Such data can be used to determine if a company or individual is at, below, or above a given capacity. In some configurations, the workload data 132 defines a value indicating an ability of the individual provider relative to a predetermined workload capacity.

The skill set data 135 identifies and quantifies a range of skills and/or abilities of a particular company or individual. The skill set data 135 may include a hierarchy of data that identifies an industry, specializations within an industry, and details with respect to these specific projects that have been performed in the past. For instance, the skill set data 135 may identify a company as a construction company capable of performing particular types of renovations. The skill set data 135 may also provide details with respect to particular renovation projects and specialized features related to those projects. The skill set data 135 can apply to any company or individual related to any industry.

The skill set data 135 can also associate a forum with a subject, e.g., a particular skill set. In some configurations, a forum of an appointment can define a medium of communication as well as a geographical location. For example, a first forum, such as an auto repair shop can be associated with certain types of service categories, subject categories, etc. In another example, one or more locations can be associated with certain activities associated with legal services. For instance, if a user requires a notary, particular office locations may be associated with such an activity. Other categories of legal services can be associated with a category of forums. For instance, if consultation is needed, a category of forums, such as on-site locations, phone calls, and videoconferencing, can be associated with such an activity. In other examples, lawn services and other like skill sets can be associated with a category of forums, such as a customer site. As will be described in more detail below, such associations can also be provided in other types of contextual data, such as preference data 129.

The work history data 133 can include performance indicators related to a provider 105 or a customer 103. For instance, the work history data 133 can indicate the quality of one or more projects performed by a provider 105. Work history data 133 can include an array of different performance indicators, which may relate to timeliness, productivity, accuracy, price, other indicators and combinations thereof. In other examples, the work history data 133 can indicate performance indicators associated with customers 103. In such examples, a customer 103 can be associated with an array of different performance indicators which may relate to a credit score or any other score associated with the behavior of a company, an individual or a group of individuals. Work history data 133 can also associate one or more forums with a subject. Such forms of work history data 133 can define past projects, where each past project has at least one forum and at least one subject. As disclosed herein, such contextual data can be used to identify a forum, e.g., a location or a medium of communication, when data identifying a subject is received.

The payment data 130 can include a record of payments that are made between two or more parties. The payment data 130 can also include data indicating the timeliness in which payments are made. The payment data 130 can include a credit score or any other data that indicates a reliability and/or ability to make timely payments.

The status data 134 can define the availability of one or more parties. For instance, status data 134 can indicate if a party is unavailable, available, or unavailable until a particular date. The status data 134 can also define a level of availability. These examples are provided for illustrative purposes and are not to be construed as limiting. It can be appreciated that the status data 134 include a form of data indicating the availability of a company, an individual or a group of individuals. Status data 134 can also associate one or more forums with a subject. For instance, status data 134 can indicate a real-time status for a provider, e.g., contextual data indicating that a provider is working on a project associated at a particular location, and that the project is associated with a subject or service category.

The preference data 129 can include customer-defined preferences or provider-defined preferences. In some configurations, the preference data 129 can include a number of weighted parameters that indicate priorities, preferences, and/or goals. For instance, a provider 105 may indicate that they are interested in identifying customers that are timely with respect to appointments. In other examples, a provider 105 may indicate that they are interested in customers having good credit or customers that may have a particular payment history. In some configurations, provider-defined preferences can include a combination of parameters and/or priorities enabling the system 100 to identify, select, and rank customers having a long-term value or a short-term value to a provider. In one illustrative example, provider-defined preferences may identify a number of performance metrics with respect to customers and each performance metric can be weighted to enable a provider 105 to identify customers having a "high lifetime value." Such preferences can be configured for providers desiring to acquire customers that can benefit their company with respect to long-term goals. The preference data 129 can include provider-defined preferences enabling the system 100 to identify, select, and rank high-volume customers, high-profile customers, and other types of customers or users that fit one or more business models. In addition to identifying preferred customers, the techniques disclosed herein can also enable a provider to "fire," e.g., terminate a relationship with, unwanted customers.

In some configurations, the preference data 129 can help customers identify and/or terminate providers. In some configurations, customer-defined preferences may indicate they are interested in identifying providers 105 having a particular quality rating. The preference data 129 can also include other data to indicate a combination of parameters, goals, and/or priorities. For instance, the preference data 129 can include customer-defined preferences enabling the system 100 to identify, select, and rank high-volume providers, high-profile providers, and other types of providers that meet the needs of a customer.

The preference data 129 can also define a value indicating a level of "interruptability" of a particular project, job, appointment, or event. As will be described in the examples provided herein, a customer 103 or a provider 105 can indicate if a particular calendar event can be interrupted by other calendar event proposals. For instance, high a level of interruptability can indicate that a meeting can end early, start late, and/or otherwise be discontinued at some point in time. A low level of interruptability can indicate that a meeting should last for the duration of the scheduled time. The level of interruptability can be quantified by a value at any scale. Such features enable the techniques disclosed herein to resolve conflicts between calendar events and identify alternative plans if conflicts arise.

It can be appreciated that a level of interruptability, priority or other preferences for a calendar event can be from a number of sources. For instance, a priority or a level of interruptability can be communicated when a calendar event is created. In some configurations, a priority for a calendar event can be based on a priority indicated by a sender of a calendar event. In such an example, a user entering input data can indicate a priority or a level of interruptability. In addition, a priority for a calendar event can be based on a priority established by a recipient of the calendar event. In such an example, a recipient may accept an invitation for an appointment and provide input data indicating a priority and/or a level of interruptability. A priority and/or a level of interruptability can also be a combination of inputs from the sender and recipient of a calendar event.

Configurations disclosed herein can select one or more forums in response to one or more predetermined actions. A predetermined action, for example, can involve the receipt of new or updated scheduling data 131, such as a meeting request or a modification of a calendar event. In another example, a predetermined action can be a change in traffic, change in weather, or any other event affecting one or more calendar events. Turning now to FIG. 2 through FIG. 4B, block diagrams show illustrative examples where data defining one or more forums is generated in response to one or more predetermined actions.

FIG. 2 illustrates aspects of the system 100 that provide a framework for several example scenarios utilizing the techniques disclosed herein. More specifically, this block diagram of the system 100 shows an illustrative example of the server 120 receiving scheduling data 131A defining a meeting request. The server 120 is also storing scheduling data 131 defining a number of calendar events for a user and preference data 129. The server 120 also receives contextual data 650 from a number of resources 106A-106E, as well as other resources described herein.

To illustrate aspects of the examples described below, the user device 101 is displaying a user interface (UI) 200 showing a number of graphical elements for displaying menu items and receiving input data. In this example, the UI 200 includes a date text field 205A, a time text field 205B, a recipient text field 205C, and a subject text field 205D. As will be described below, entries in the date text field 205A, time text field 205B, the recipient text field 205C, and/or the subject text field 205D provide input data. The system 100 utilizes the input data and contextual data from a number of resources to select one or more forums. Data indicating the selected forums can be used to populate a graphical element 207. In addition, the techniques disclosed herein can generate a ranked list of forums based on analysis of the contextual data and input data.

Figure 3A:
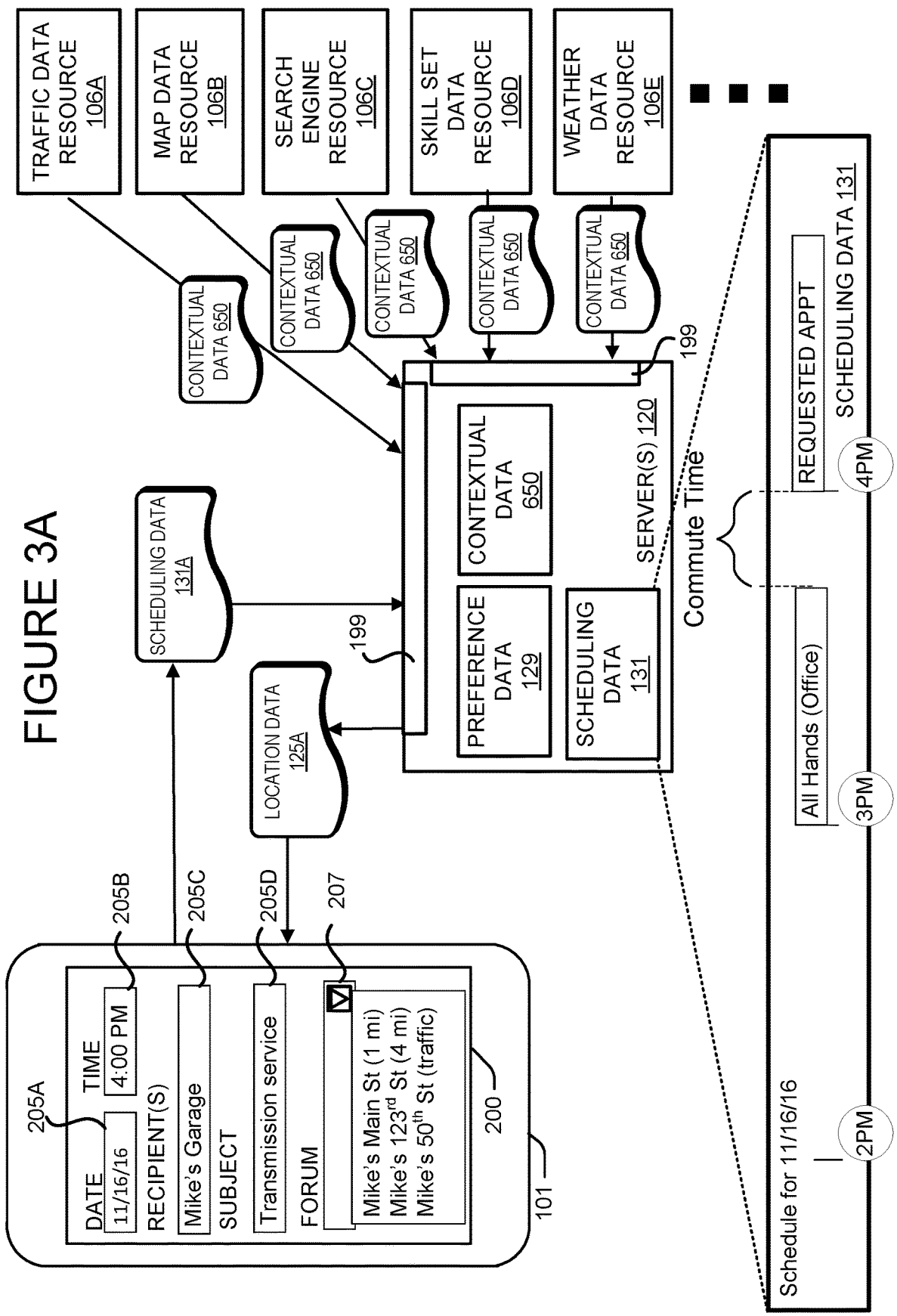

Referring now to FIG. 3A, one illustrative example scenario is shown and described. In this example, the user 103 of the device 101 provides input data indicating a desire to schedule an appointment to service the transmission of a vehicle. In this example, the user 103 also indicates a desire to work with a particular service provider, Mike's Garage. In this example, the user 103 also indicates a desired start time of 4 PM on Nov. 11, 2016.

In this example, it is a given that the server 120 stores contextual data, such as preference data 129, associating individual forums with at least one subject, e.g., services categories. In this example, the preference data 129 indicates that three locations of Mike's Garage are outfitted to perform major car services, such as transmission maintenance and engine tune-ups: a location on Main Street, a location on 50th Street, and a location on 123rd Street. Another location of Mike's Garage, on 10th Street, is outfitted to perform minor car services such as windshield repairs, light replacements, and fluid replacements.

In this example, it is a given that the customer has provided preference data 129 indicating one or more goals, such as a desire to reduce commute times. These examples are provided for illustrative purposes and are not to be construed as limiting. Other goals and parameters may be provided, which may include fuel savings and/or other goals that can influence the selection of one or more forums. Other factors disclosed herein, such as the interruptability of an appointment, can also be indicated in preference data 129 and utilized to influence a process for selecting a forum.

In response to receiving the input data from the device 101, the server 120 performs a number of operations to select a contextually relevant forum. In one operation, the server 120 analyzes the preference data 129 in view of a subject, e.g., a service category, defined in the input data. In this example, the input data indicates a subject, transmission service. Any number of language interpretation technologies can be utilized to interpret input data to identify a subject or a service category. The service category or subject that is interpreted from the input data can be analyzed in view of the service categories identified in the preference data 129. In this example, the service category identified in the input data aligns with a service category in the preference data 129. Since the identified service category, e.g., transmission service, is associated with three locations, those locations are selected. More specifically, the locations on Main Street, 50th Street, and 123rd Street are selected as forum candidates.

The process can filter and/or rank the forum candidates. In one configuration, a filter or rank of the forum candidates can be based on a probability of a commute. The probability of a commute can be determined by a number of factors. In some configurations, the location associated with a preceding calendar event can be obtained. Based on the location of the preceding calendar event, commute projections are generated using the map data, traffic data, weather data and/or other contextual data. In this example, the user 103 is scheduled to be at the all hands meeting at the office, a meeting which is scheduled end at 3:45.

Based on the length of the commute time, a probability of a commute from the location of the preceding calendar event to the locations of the forum candidates are generated. Any number of technologies for projecting commutes can be utilized. In some configurations, historical traffic data, historical weather data, and forecast data can be utilized to determine a probability of a commute. In this example, a probability to commute can be based on the projected commute time, 15 minutes, and an analysis of the contextual data received from each resource 106. The probability of the commute can be further based on a ratio of successful commutes of one or more projected routes within a predetermined commute time. The predetermined commute time can be based on a time between one or more calendar events. In addition, the predetermined commute time can be varied based on the level of interruptability. For example, a high level of interruptability of an adjacent meeting can decrease the predetermined commute time. In addition, a low level of interruptability of an adjacent meeting can increase the predetermined commute time.

If traffic in a particular route is projected to be high during the commute time, the probability of the commute can be lowered. If traffic in a particular route is projected to be low during the commute time, the probability of a commute can be raised. Weather can also be a factor. The weather conditions during the commute time are forecasted to be poor, the probability of a commute can be lowered. Map data may also be used to generate different routes between each forum candidate and each route can have an associated probability. A probability of a commute can be determined for each route to a single forum candidate. One or more determined probabilities can be utilized to rank and/or filter the forum candidates.

As shown in FIG. 3A, the forum candidates are ranked and filtered. As a result, location data 125A indicating the ranked and filtered forum candidates are communicated from the server 122 the device 101. As also shown, the ranked list of forum candidates can be displayed in the graphical element 207 of the UI 200. In this example, the Main Street location is ranked first, the 123rd St. location is ranked second, and the 50th St. location is ranked third. The 10th Street location was filtered and not communicated as a forum candidate.

The graphical element 207 can also include other information, such as a travel distance, a value indicating the probability of the commute, and other related information. In this example, the graphical element 207 includes a menu showing the ranked forum candidates. The menu can allow a user to select one of the candidates. In addition, the system 100 can automatically select one of the forum candidates as a forum to associate with one or more calendar events, such as a calendar event defined in the input data.

In some configurations, the forum candidates can be filtered based on one or more thresholds. For instance, if the probability of the commute for one location drops below a threshold, such forum candidates may not appear on a ranked list. Other factors influence the filtering of the forum candidates. For example, if the interruptability of a preceding meeting, such as the all hands meeting, is low, or the priority of the all hands meeting is high, the detection of data indicating such scenarios may raise the threshold for the filter. Thus a high-priority meeting may cause the third forum candidate, the 50th St. location, to be filtered from the ranked list.

Figure 3B:
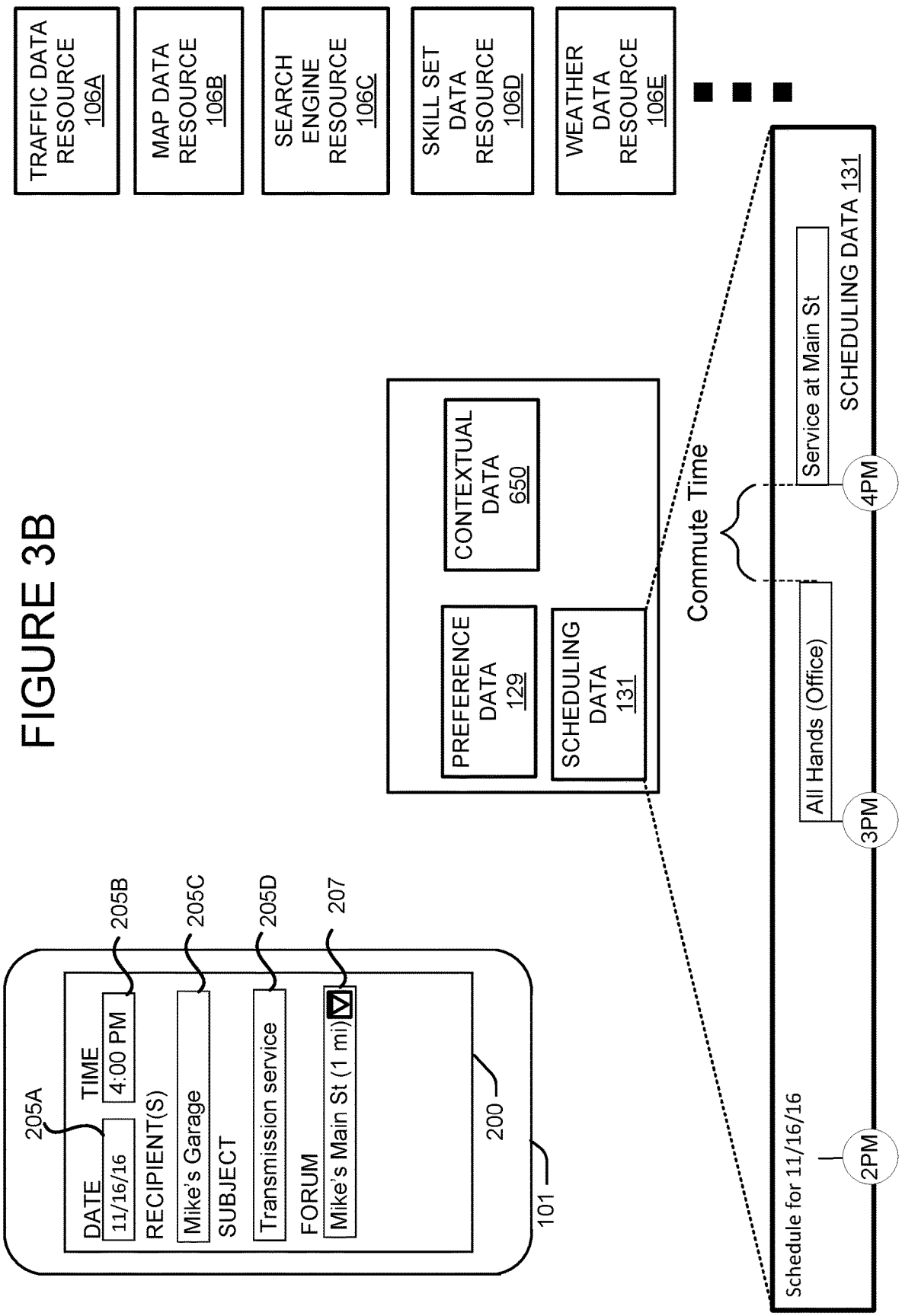

A single forum can be automatically selected based on one or more criteria. For instance, if a probability of a commute exceeds a threshold, a single forum can be automatically selected. In other configurations, a graphical element, such as the graphical element 207 shown in FIG. 3A, can be configured to receive a user selection. As shown in FIG. 3B, first forum candidate, Mike's on Main Street, is selected. Once a forum is selected, the scheduling data 131 stored the server 120 can be updated. The scheduling data 131 can store data defining a calendar event based on the input data and the selected forum.

As summarized above, the techniques disclosed herein can continuously analyze scheduling data 131 to dynamically modify forums for various calendar events based on changed circumstances. FIG. 3C illustrates one example where a forum is modified based on a predetermined action. In this example, the traffic data resource 106A provides updated contextual data 650 indicating road closures near the selected forum, the Main Street location, on Nov. 11, 2016. In response to such contextual data 650, the server 120 analyzes the map data, weather data, the updated traffic data and/or other data to re-rank the forum candidates. In this example, in response to receiving and analyzing the updated contextual data 650, it is a given that the ranking for the Main Street location has dropped below a threshold, and the 123rd St. location emerges as the highest ranked forum. In such an event, an automatic update of the location data 125A indicated from the server 122 the device 101. As shown in FIG. 3C, the new forum can be displayed on the UI 200. The scheduling data 131 stored at the server 120 can also be updated.

This example is provided for illustrative purposes and is not to be construed as limiting. It can be appreciated that any type of contextual data can be utilized to generate an automatic update. For instance, if it is determined that forecasted weather conditions will affect a commute, a probability associated with a commute can be adjusted accordingly. In addition to utilizing preference data to identify an association between a forum and a subject, the techniques disclosed herein can also involve other types of contextual data to identify an association between a forum and a subject.

Referring now to FIG. 4A, another illustrative example scenario is shown and described. In this example, the user 103 of the device 101 provides input data indicating a desire to schedule an appointment to consult with a lawyer. In this example, the user 103 also indicates a desire to work with a particular service provider, James McGill. In this example, the user 103 also indicates a desired start time of 2 PM for a 30-minute meeting on Nov. 11, 2016.

Also, in this example, it is a given that the server 120 stores preference data 129 associating one or more forums with different categories of services. In the preference data 129, it is given that the provider has indicated two forums for meeting with clients: office visits are established as a default forum and phone calls can be used when a scheduling conflict is detected.

In response to receiving the input data from the device 101, the server 120 performs a number of operations to select a contextually relevant forum. In this example, the input data is analyzed in view of the preference data 129 and the contextual data 650. In some configurations, the server 120 determines a probability of a commute from a preceding calendar event. In addition, the server 120 determines a probability of a commute to a subsequent calendar event. In this example, the user 103 does not have a preceding calendar event, thus no conflict is presented. However, the user does have a subsequent calendar event, the all-hands meeting, and a probability of the commute from the proposed time to the all-hands meeting is determined. As summarized above a number of existing technologies can be utilized to determine a probability of the commute. Some technologies can utilize map and routing technologies. In addition, weather conditions, traffic conditions and other conditions can be used to adjust the probability of the commute.

In this example, it is a given that the probability of a commute between the location of the proposed appointment and the location of the existing meeting falls below a threshold. Thus, the default forum, an in-person meeting at the law office, is not an option, and the selected forum includes a phone call. Location data 125B indicating the selected forum is communicated from the server 122 the device 101. The location data 125B can be utilized to populate the graphical element 207.

FIG. 4B illustrates one example where the forum selected in the example process of FIG. 4A is modified based on a predetermined action. In this example, the all hands meeting scheduled at 3 PM is canceled. Based on the presence of such a predetermined action, the server 120 analyzes the contextual data 650 and the scheduling data 131 to determine if a new forum should be recommended. In this example, given that the all-hands meeting presented a conflict that prevented the use of a default forum, the cancellation of the all-hands meeting removes the conflict and thus the default forum can be selected. As shown, an automatic update of the location data 125B is communicated from the server 122 the device 101. In addition, the scheduling data 131 is updated by the server 120.

In some configurations, other types of contextual data can be analyzed to select a forum. For example, workflow data 128 can define a process for constructing a house. The workflow data 120 can include a number of stages such as a design stage, a land feasibility stage, a framing stage, and a finishing stage. Each stage of the process can be associated with one or more forums. For example, the design stage can be associated with an office building for an architect, a city planner, or an inspector. Land feasibility stage can be associated with an office of the Geotech expert or a residence of the homeowner. The framing stage can be associated with the construction site. Also, in this example, the finishing stage can be associated with the construction site and a factory manufacturing the finish hardware. In such an example, when a user initiates a meeting request indicating a stage or a date of a stage, the techniques disclosed herein can analyze the workflow data 128 and identified one or more locations based on the associated locations. In addition, traffic data, weather data, and map data can be analyzed to enable a more granular level of analysis to increase a probability of a commute and increase a probability of a successful meeting.

Figure 5:
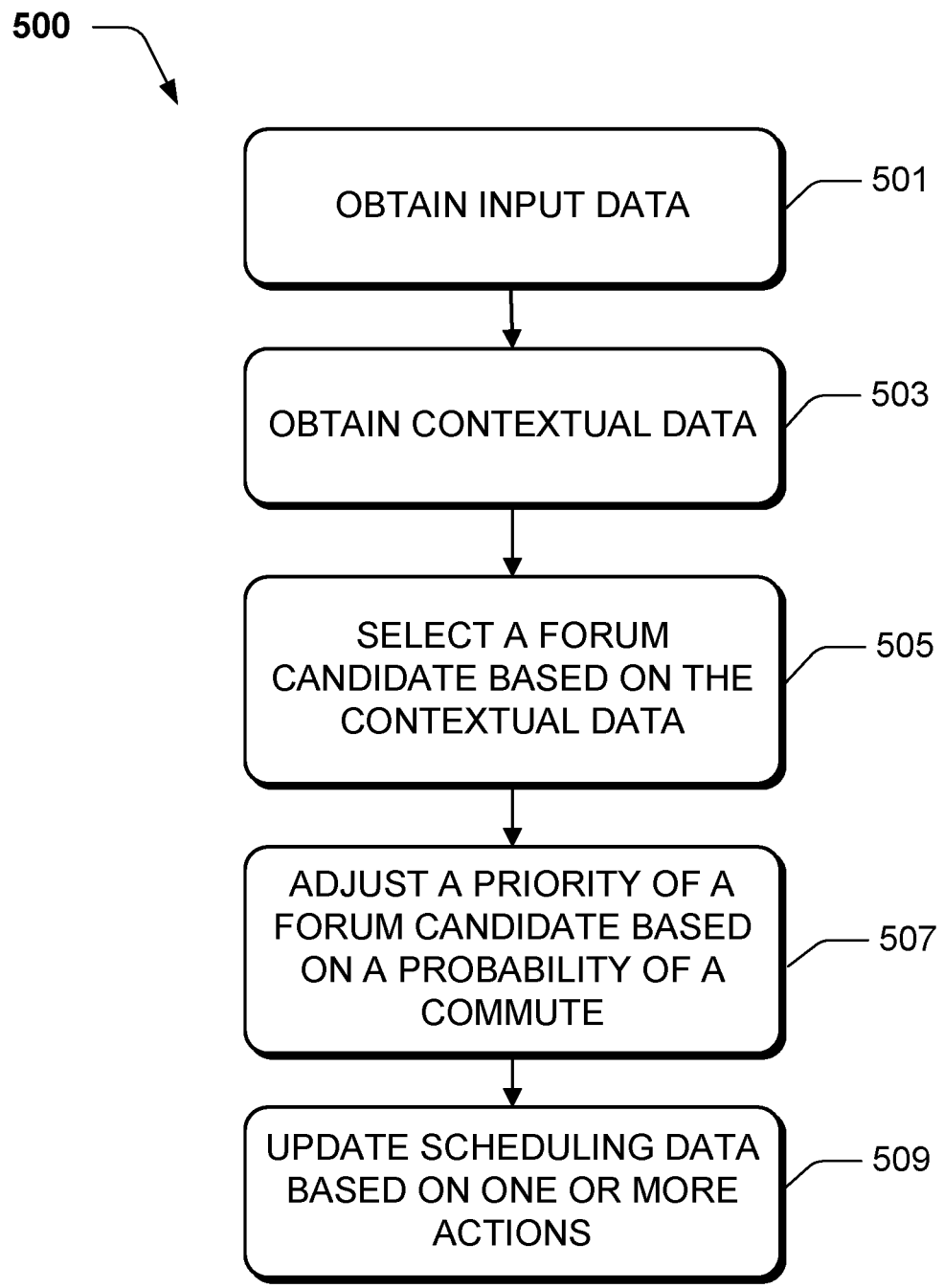
FIG. 5 is a flow diagram showing a routine disclosed herein for enabling contextually-aware selections of event forums.

Turning now to FIG. 5, aspects of a routine 500 for enabling contextually-aware selections of event forums are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with the FIGURES described herein, the operations of the routine 500 are described herein as being implemented, at least in part, by an application, component, and/or circuit. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a computer working alone or in conjunction with other software modules, such as the server module 121.

With reference to FIG. 5, the routine 500 begins at operation 501, where one or more computing devices obtain input data. The input data can include a voice input, a text input, a selection of a menu item, or other types of input where an action is initiated by, or data is received from, a user or a computing device. For example, a user can say or type information into an email or a calendar event describing a subject, area of interest, project or an event. In other examples, a user can provide other forms of input data, such as a text description or a voice input indicating a service category, e.g., "I need to build an appointment to repair my car," or "I need to make an appointment for my lawyer."

In operation 503, the one or more computing devices obtain contextual data. As described herein, the contextual data can be obtained from a number of different resources. For example, contextual data can be obtained from a traffic data resource 106A, map data resource 106B, search engine resource 106C, specialty data resource 106D, and a weather data resource 106E, and/or other resources suitable for storing, processing, and/or communicating contextual data.

The contextual data can be related to service providers and/or consumers. The contextual can include, for example, data defining a prior work history between two or more entities, payment histories, credit histories, an availability of one or more parties, a location of a project, travel time to an appointment, traffic data, skill set data, preferred business hours, scheduling availability, performance metrics, scheduling conflicts, customer preferences, vendor preferences, workflow definitions, other data, and combinations thereof. The techniques disclosed herein can also quantify a value of a customer or a value of a vendor. Such contextual data can be received from one or more resources or such contextual data can be derived from other types of contextual data. For instance, data defining a lifetime value of a customer or a lifetime value of a provider can be generated from payment histories, credit histories, and other information. Such contextual data can be used to filter or rank a forum candidate. For instance, if a customer and a particular provider having worked in the past at a particular location, the ranking or priority of that particular location can be increased.

Next, in operation 505, one or more computing devices can select one or more forum candidates based on the analysis of contextual data. As summarized above, one or more forum candidates can be selected based on contextual data associating a subject with at least one forum. A forum may include a geographical location or another communication medium. The contextual data can include traffic data 124, location data 125, specialty data 126, map data 127, workflow data 128, preference data 129, payment data 130, scheduling data 131, workload data 132, work history data 133, status data 134, skill set data 135, weather data 136, and other data described herein. If input data indicates a subject, and the subject is associated with one or more forums, the one or more forums can be selected as a forum candidate.

Next, in operation 507, one or more computing devices can adjust a priority associated with the one or more forum candidates. A priority associated with a forum candidate can be used to filter or rank the forum candidates. The priority associated with a forum can be based on an analysis of the contextual data. For instance, a probability of a commute between an existing calendar event and a new calendar event can be determined and utilized to generate a priority of a forum candidate. A number of factors, which may be influenced by weather, traffic, road closures, and conditions presented in received contextual data, used to determine a priority associated with a particular forum candidate.

Next, in operation 509, one or more computing devices can update scheduling data based on one or more actions. For example, a user selection of a forum candidate can cause the computing device to update scheduling data based on the selected forum. In addition, a forum candidate can be selected by a computing device if a priority associated with the forum candidate meets or exceeds one or more thresholds. In addition, in operation 509, based on the detection of one or more predetermined actions, scheduling data may be modified to associate an alternative forum or a new forum for a calendar event.

Figure 6:
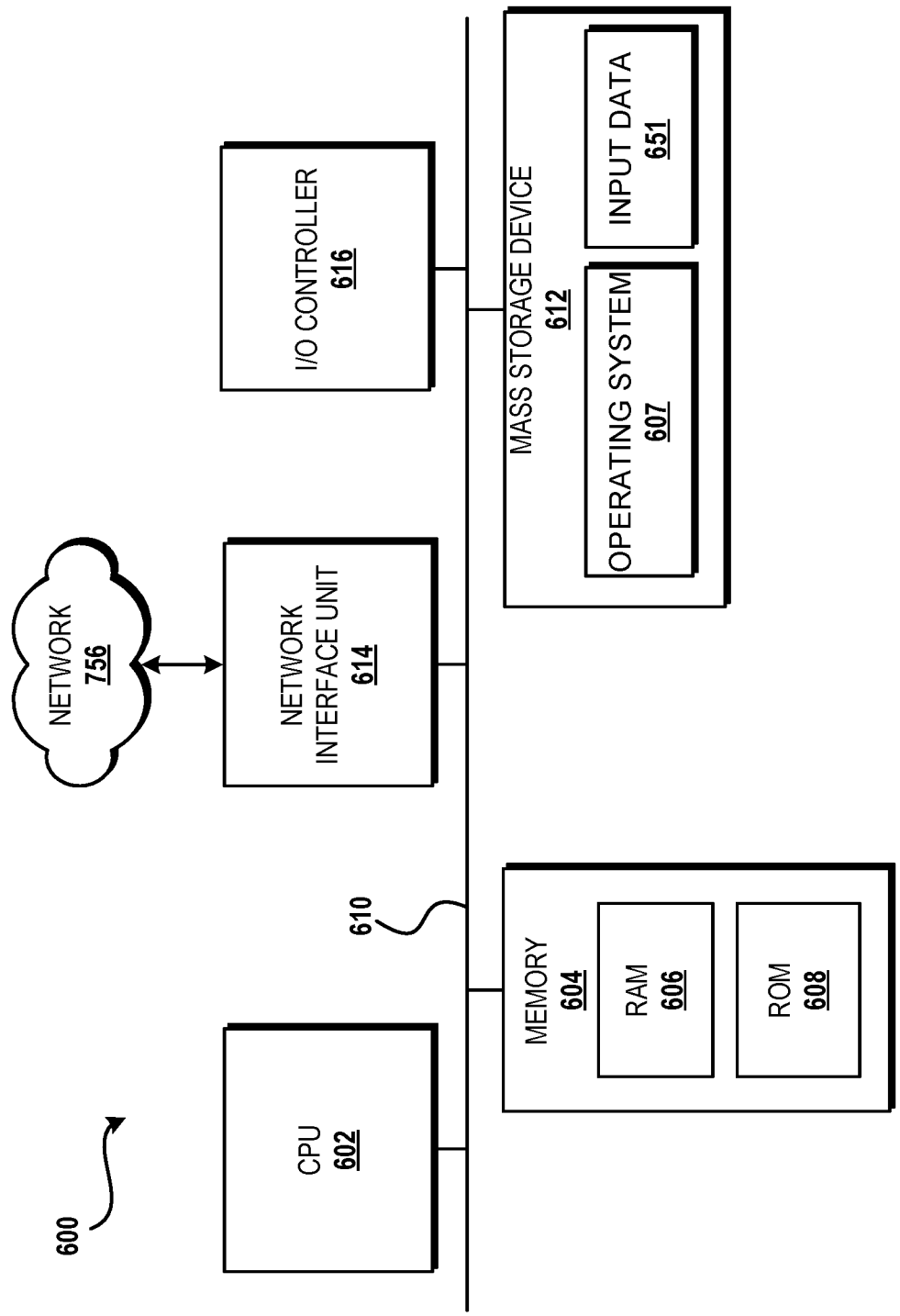
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the computing device 101 (FIG. 1), capable of executing the program components described herein. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, data, such as contextual data 650, input data 651, and one or more application programs.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 756 and/or another network (not shown). The computer architecture 600 may connect to the network 756 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
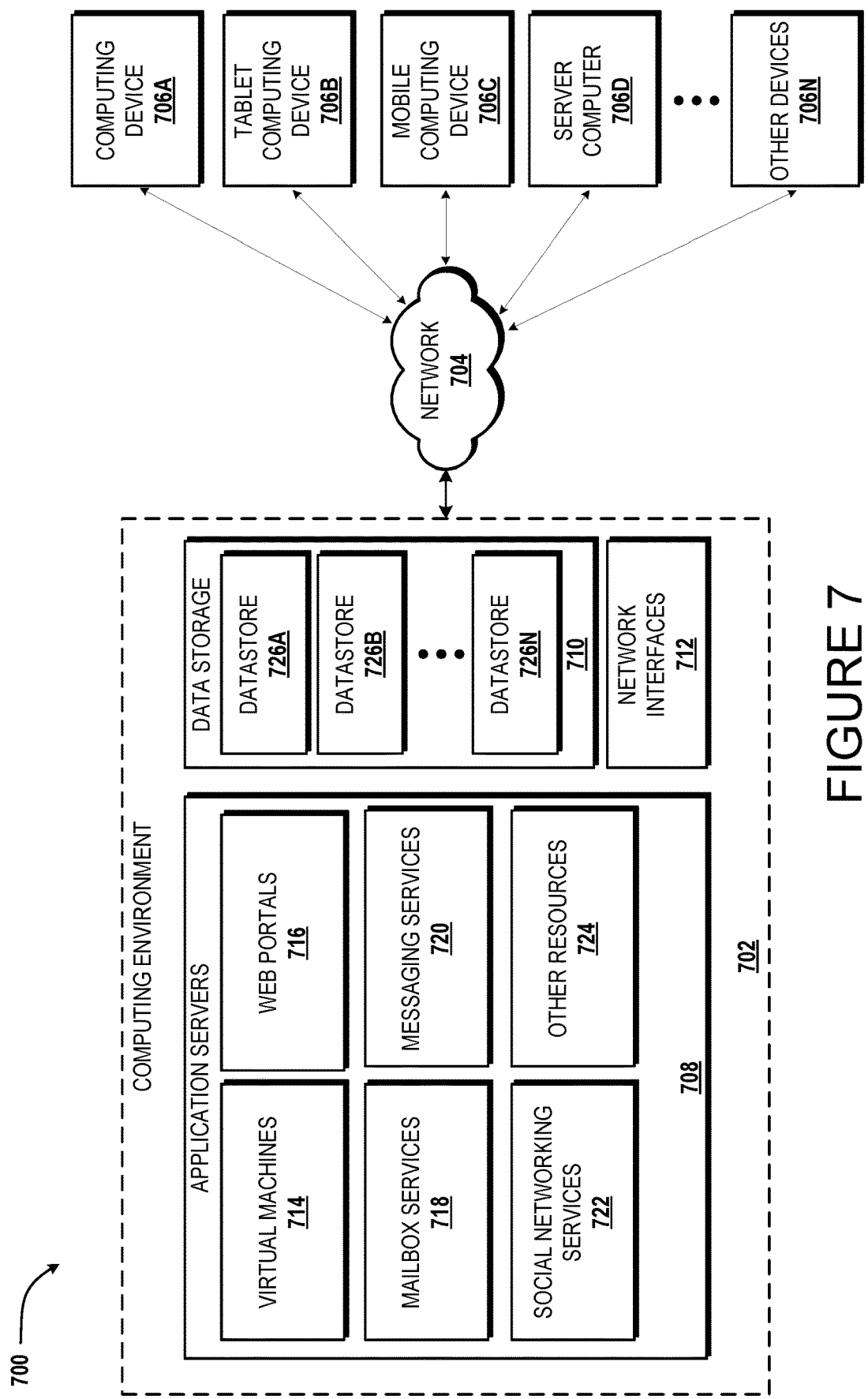
FIG. 7 is a diagram illustrating a distributed computing environment capable of implementing aspects of the techniques and technologies presented herein.

FIG. 7 depicts an illustrative distributed computing environment 700 capable of executing the software components described herein for enabling contextually-aware selections of event forums. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 756, described above. The network 704 also can include various access networks. One or more client devices 706A-706N (hereinafter referred to collectively and/or generically as "clients 706") can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 606 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling contextually-aware selections of event forums. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/ or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein for enabling contextually-aware selections of event forums. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 5.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein provided herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual data stores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for enabling contextually-aware selections of event forums, among other aspects.

Figure 8:
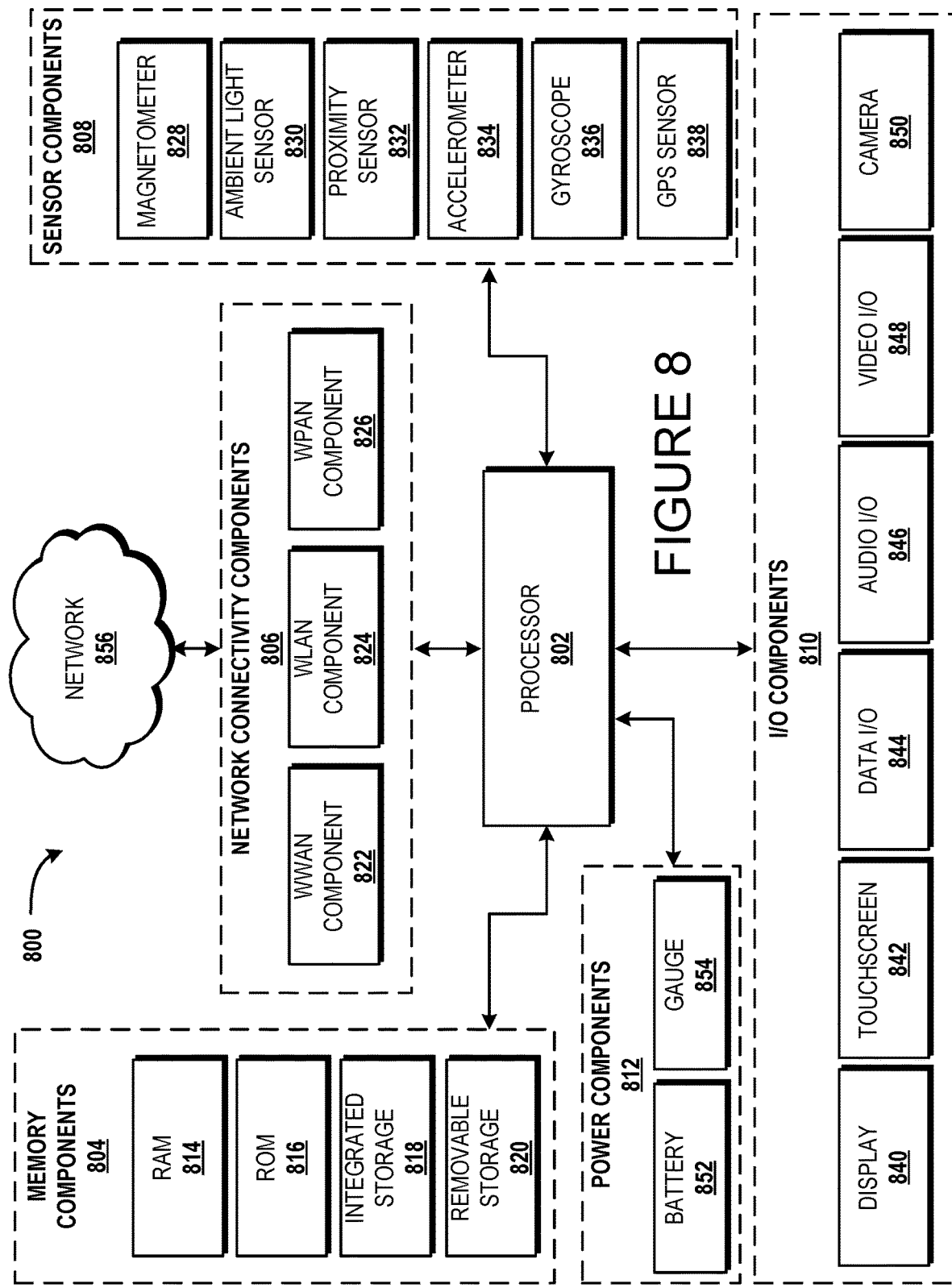
FIG. 8 is a computer architecture diagram illustrating a computing device architecture for a computing device capable of implementing aspects of the techniques and technologies presented herein.

Turning now to FIG. 8, an illustrative computing device architecture 800 for a computing device that is capable of executing various software components described herein for enabling contextually-aware selections of event forums. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the clients 706 shown in FIG. 7. Moreover, aspects of the computing device architecture 800 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 756 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UNITS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The disclosure presented herein may be considered in view of the following clauses.

Clause A: A computer-implemented method comprising: receiving, at a computing device, scheduling data defining a first calendar event, wherein the scheduling data indicates a meeting time and a subject; receiving, at the computing device, contextual data defining an association between at least one forum and one or more subject categories; obtaining stored scheduling data defining an existing calendar event preceding or succeeding the time of the received calendar event; determining a probability of a commute between a location associated with the existing calendar event and the at least one forum, wherein the probability of the commute is based on a ratio of successful commutes of one or more projected routes within a predetermined commute time; determining a priority for the at least one forum associated with the one or more subject categories based, at least in part, the probability of the commute and a degree of relevancy between the subject indicated in the scheduling data and the one or more subject categories; displaying data indicating the at least one forum.

Clause B: The method of Clause A, further comprising: selecting the at least one forum if the priority meets or exceeds a threshold.

Clause C: The methods of Clauses A and B, further comprising, updating the scheduling data to associate the first calendar event and the at least one forum if the priority meets or exceeds a threshold.

Clause D: The methods of Clauses A-C, wherein the degree of relevancy between the subject indicated in the scheduling data and the one or more subject categories is based on a natural language process for quantifying relationships between words and phrases.

Clause E: The methods of Clauses A-D, wherein the probability of the commute is further based on the ratio of successful commutes of the one or more projected routes that are based, at least in part, on weather data.

Clause F: The methods of Clauses A-E, wherein the probability of the commute is further based on the ratio of successful commutes of the one or more projected routes that are based, at least in part, on traffic data.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
   receiving, at a computer device, input data from a user interface used to schedule an event;
   in response to the receiving the input data, identifying, at the computer device, a context associated with the event;
   aligning, at the computer device, the identified context associated with the event with context associated with data from resources, wherein the resources include one or more forums associated with the context associated with the data from the resources;

in response to the aligning the identified context associated with the event with the context associated with the data from the resources, generating, at the computer device, a ranked list of the one or more forums;

determining, at the computer device, a level of interruptability of an adjacent event to the event, wherein the adjacent event is to last a duration of a scheduled time when the level of interruptability is at a first level, wherein the computing device is allowed to modify at least one of a start time or an end time of the adjacent event when the level of interruptability is at a second level;

in response to determining that the level of interruptability of the adjacent event is below a threshold, generating a filtered ranked list by removing, at the computer device, the forum of the event from the ranked list based on a probability of commute between the adjacent event and the forum of the event; and enabling a display, at the computer device, of the one or more forums of the filtered ranked list.

2. The computer-implemented method of claim 1, wherein the one or more forums includes at least a telephone call, a video conference call, or an instant message chat, and selecting one of the one or more forums causes the selected forum to be the forum of the event.

3. The computer-implemented method of claim 1, wherein the one or more forums includes at least a geographic location, global coordinates, an address, or a room number, and selecting of one of the one or more forums causes the selected forum to be the forum of the event.

4. The computer-implemented method of claim 1, wherein the displaying for selection the one or more forums of the aligned context provides efficiencies of time and resources by automatically identifying and presenting for selection the one or more forums in response to the aligned context.

5. A computer readable storage medium storing instructions that cause a processor of a computing device to:

receive input data from a user interface used to schedule an event;

in response to the receive the input data, identify a context associated with the event;

align the identified context associated with the event with context associated with data from resources, wherein the resources include one or more forums associated with the context associated with the data from the resources;

in response to the align the identified context associated with the event with the context associated with the data from the resources, generate a ranked list of the one or more forums;

determine a level of interruptability of an adjacent event to the event, wherein the adjacent event is to last a duration of a scheduled time when the level of interruptability is at a first level, wherein the computing device is allowed to modify at least one of a start time or an end time of the adjacent event when the level of interruptability is at a second level;

in response to the determine that the level of interruptability of the adjacent event is below a threshold, remove the forum of the event from the ranked list to generate a filtered ranked list based on a probability of commute between the adjacent event and the forum of the event; and enable displaying of the one or more forums of the filtered ranked list.

6. The computer readable medium of claim 5, further comprises:

determine a probability that a commute to the forum in the ranked list of the one or more forums is below a threshold, wherein at least traffic data is used in generating the probability; and in response to the probability that the commute to the forum in the ranked list of the one or more forums is below the threshold, filter out the forum from the ranked list.

7. The computer readable medium of claim 5, wherein the one or more forums includes at least a telephone call, a video conference call, or an instant message chat, and select one of the one or more forums causes the selected forum to be the forum of the event.

8. The computer readable medium of claim 5, wherein the one or more forums includes at least a geographic location, global coordinates, an address, or a room number, and select one of the one or more forums causes the selected forum to be the forum of the event.

9. The computer readable medium of claim 5, wherein the display for selection the one or more forums of the aligned context provides efficiencies of time and resources by automatically identifying and presenting for selection the one or more forums in response to the aligned context.

10. A system comprising:

at least one processor;

at least one memory in communication with the at least one processor, the at least one memory having computer-readable instructions stored thereupon that, when executed by the at least one processor, cause the at least one processor to:

receive input data from a user interface used to schedule an event;

in response to the receive the input data, identify a context associated with the event;

align the identified context associated with the event with context associated with data from resources, wherein the resources include one or more forums associated with the context associated with the data from the resources;

in response to the align the identified context associated with the event with the context associated with the data from the resources, generate a ranked list of the one or more forums;

determine a level of interruptability of an adjacent event to the event, wherein the determine the level of interruptability of the adjacent event to the event is low, which indicates that the adjacent event last a duration of scheduled time, wherein the determine the level of interruptability of the adjacent event to the event is high, which indicates that the adjacent event is permitted to end early, start late, or discontinue at a point in time during the scheduled time;

in response to the level of interruptability of the adjacent event to the event is below a threshold, generate a filtered ranked list by removing the forum of the event from the ranked list based on a probability of commute between the adjacent event and the forum of the event; and enable displaying of the one or more forums of the filtered ranked list.

11. The system of claim 10, further comprises:

determine a probability that a commute to the forum in the ranked list of the one or more forums is below threshold, and in response to the probability that the commute to the forum in the ranked list of the one or more forums is below the threshold, filter out the forum from the ranked list.

12. The system of claim 10, wherein the one or more forums includes at least a telephone call, a video conference call, or an instant message chat, and select one of the one or more forums causes the selected forum to be the forum of the event.

13. The system of claim 10, wherein the one or more forums includes at least a geographic location, global coordinates, an address, or a room number, and select one of the one or more forums causes the selected forum to be the forum of the event.

14. The system of claim 10, wherein the determine the level of interruptability of the adjacent event to the event is communicated when the adjacent event is created.

\* \* \* \* \*